ns

(56) References Cited

FOREIGN PATENT DOCUMENTS

| | | |
|---|---|---|
| JP | 2009-001765 A | 1/2009 |
| WO | 2012-128294 A1 | 9/2012 |
| WO | 2013/083406 A1 | 6/2013 |
| WO | WO 2013137621 A1 * | 9/2013 ............... C09J 4/00 |
| WO | 2004-202402 A1 | 12/2014 |

OTHER PUBLICATIONS

Canadian Office Action corresponding to Canadian Application No. 2,913,389 dated Apr. 23, 2018.
English translation of Japanese Office Action corresponds to Japanese Application No. 2016-520366 dated Oct. 4, 2018.
Third Chinese Office Action corresponding to Chinese Application No. 201480034547.1 dated Jun. 15, 2018.
Translation of Office Action dated May 15, 2019, and issued in connection with Japanese Patent Application No. 2016-520366.

* cited by examiner

REACTIVE 2-COMPONENT ADHESIVE FILM SYSTEM

This is a 371 of PCT/EP2014/061748 filed 5 Jun. 2014, which claims foreign priority benefit under 35 U.S.C. 119 of German Patent Application 10 2013 211 319.6 filed Jun. 17, 2013, and German Patent Application 10 2013 222 739.6 filed Nov. 8, 2013, the entire contents of which are incorporated herein by reference.

The present invention relates to a 2-component adhesive system in film form for bonding various materials, such as, for example, metal, wood, glass and/or plastic material. The 2-component adhesive system comprises two reactive adhesive films each comprising (a) a polymeric film-forming matrix and (b) at least one reactive monomer, wherein the first adhesive film additionally comprises at least one radical initiator and the second adhesive film additionally comprises at least one activator. There is additionally provided a method for producing the reactive adhesive films according to the invention, as described above, and a kit for providing the reactive adhesive film system according to the invention, comprising a first and a second reactive adhesive film, as described above.

BACKGROUND OF THE INVENTION

2-Component adhesive systems have generally been known for many years and are described in detail in the specialist literature. In such systems, an adhesive system consisting of two components is applied to the parts to be bonded, wherein two liquid components are conventionally used. For example, in the case of chemically reacting 2-component polymerization adhesive systems, one component comprises the monomer to be polymerized and an activator and the other component comprises a radical-forming substance (also called curing agent or initiator) and the monomer to be polymerized. After the two components have been mixed, or at least brought into contact, and activated, which in most cases takes place by means of heat, the radical-forming substance is cleaved into two radicals by the activator and the polymerization reaction of the monomers to be polymerized begins. The radical chain polymerization of the monomer then takes place until chain termination occurs, and the adhesive composition cures, whereby permanent bonding of the parts to be bonded is achieved.

A disadvantage of such liquid 2-component polymerization adhesive systems is that they are often not clean to use, because the two components must in most cases be applied in the liquid to pasty state to the parts to be bonded. This is a problem especially in the case of bonds over large areas and/or in applications in which the surfaces are uneven, for example sloping. In addition, activation of the adhesive system generally takes place at elevated temperatures, which can be a problem for sensitive substrates, such as, for example, anodized aluminum. A further disadvantage of such systems is that the storage stability of the two components can be critical. Moreover, after they have cured fully, conventional 2-component polymerization adhesive systems are frequently associated with problems which only come to light in the event of shocks. Thus, in the case of the systems of the prior art, cracks or breaks can occur in the region of the bonds as a result of violent shocks.

Accordingly, the object underlying the present invention is to provide an improved reactive 2-component adhesive system. Against this background, the present invention proposes a reactive 2-component adhesive system in film form for bonding various materials, in order to avoid the above-described problems of known, liquid 2-component adhesive systems.

In particular, there is provided a reactive 2-component adhesive system in film form which is simple to handle and ideally already exhibits tackiness, so that there is no slipping when applied to the substrates to be bonded and more precise bonding is possible than with the liquid 2-component polymerization adhesive systems known in the prior art.

SUMMARY OF THE INVENTION

The present invention relates to a reactive adhesive film system comprising two reactive adhesive films, wherein the first adhesive film comprises (a) a polymeric film-forming matrix, (b) at least one reactive monomer or reactive resin and (c) at least one initiator, in particular radical initiator, and the second adhesive film comprises (a) a polymeric film-forming matrix, (b) at least one reactive monomer or reactive resin and (c) at least one activator.

This reactive adhesive film system is suitable as a 2-component polymerization adhesive system in film form for the improved bonding of various materials.

DETAILED DESCRIPTION

According to the invention, the above-described object is achieved by a reactive adhesive film system comprising two reactive adhesive films. This adhesive film system is characterized in that the first reactive adhesive film comprises a polymeric film-forming matrix (a), at least one reactive monomer or reactive resin (b) and an initiator, in particular radical initiator (c) and the second reactive adhesive film comprises a polymeric film-forming matrix (a), at least one reactive monomer or reactive resin (b) and an activator (c).

In one embodiment according to the invention there is consequently provided a reactive adhesive film comprising (a) a polymeric film-forming matrix, (b) at least one reactive monomer or reactive resin and (c) a reagent selected from an initiator, in particular a radical initiator, or an activator.

In a further embodiment according to the invention there is provided a reactive adhesive film system comprising two reactive adhesive films, characterized in that the first reactive adhesive film comprises an initiator, in particular a radical initiator, and the second reactive adhesive film comprises an activator.

In a further embodiment according to the invention there is disclosed a method for producing a reactive adhesive film according to the invention, wherein the method comprises the following steps:

1. dissolving and/or finely distributing the ingredients in one or more solvent(s) and/or water,
2. mixing the dissolved or finely distributed ingredients,
3. coating a release liner or release paper, a backing material or a pressure sensitive adhesive with the mixture of dissolved or distributed ingredients according to step 2,
4. evaporating the solvent and/or water, and
5. optionally winding the reactive adhesive film into a roll, wherein the ingredients include (a) a polymeric film-forming matrix, (b) at least one reactive monomer or reactive resin and (c) a reagent selected from an initiator, in particular a radical initiator, or an activator.

Steps 1 and 2 can also take place in one step, that is to say the ingredients are dissolved and/or finely distributed simultaneously.

In a further embodiment according to the invention there is disclosed a method for producing a reactive adhesive film according to the invention, wherein the method is solvent- and water-free. Accordingly, formulations for reactive adhesive films according to the invention are produced by the action of heat and/or shear, for example in a hot melt kneader or compounding extruder.

In another embodiment according to the invention there is disclosed a kit for providing a two-component adhesive film system, comprising (i) at least one first reactive adhesive film which comprises an initiator, in particular a radical initiator, and (ii) at least one second reactive adhesive film which comprises an activator.

In a further embodiment according to the invention there is disclosed a composite bonded by means of the reactive adhesive film system according to the invention or by means of the kit according to the invention.

The components of the adhesive films according to the invention, or of the adhesive film system according to the invention, are described in detail below.

Polymeric Film-forming Matrix

The adhesive films according to the invention in principle comprise a matrix, called the polymeric film-forming matrix below, containing the reactive monomers to be polymerized and/or reactive resins. The purpose of the matrix is to form an inert basic structure for the reactive monomers and/or adhesive resins so that they are not—as in the prior art—in liquid form and thus able to cause the mentioned problems, but are incorporated in a film or a foil. Easier handling is thus ensured.

Inert in this context means that the reactive monomers and/or reactive resins substantially do not react with the polymeric film-forming matrix under suitably chosen conditions (e.g. at sufficiently low temperatures).

Suitable film-forming matrices for use in the present invention are preferably chosen from the following list: a thermoplastic polymer, such as, for example, a polyester or copolyester, a polyamide or copolyamide, a polyacrylic acid ester, an acrylic acid ester copolymer, a polymethacrylic acid ester, a methacrylic acid ester copolymer, thermoplastic polyurethanes as well as chemically or physically cross-linked substances of the above-mentioned compounds. In addition, blends of different thermoplastic polymers can also be used.

Furthermore, elastomers and thermoplastic elastomers, on their own or in a mixture, are also conceivable as the polymeric film-forming matrix. Thermoplastic polymers, in particular semi-crystalline thermoplastic polymers, are preferred.

Thermoplastic polymers having softening temperatures of less than 100° C. are particularly preferred. In this connection, the expression softening point denotes the temperature from which the thermoplastic granules bond to themselves. If the constituent of the polymeric film-forming matrix is a semi-crystalline thermoplastic polymer, then it very preferably has, in addition to its softening temperature (which is associated with the melting of the crystallites), a glass transition temperature of not more than 25° C., preferably not more than 0° C.

In a preferred embodiment according to the invention, a thermoplastic polyurethane is used. The thermoplastic polyurethane preferably has a softening temperature of less than 100° C., in particular less than 80° C.

In a particularly preferred embodiment according to the invention, Desmomelt 530®, which is obtainable commercially from Bayer Material Science AG, 51358 Leverkusen, Germany, is used as the polymeric film-forming matrix. Desmomelt 530® is a hydroxyl-terminated, largely linear, thermoplastic polyurethane elastomer with a high rate of crystallization.

According to the invention, the amount of polymeric film-forming matrix is in the range of approximately from 20 to 80% by weight, preferably approximately from 30 to 50% by weight, based on the total mixture of the constituents of the reactive adhesive film. There is most preferably used from 35 to 45% by weight, preferably approximately 40% by weight, of the polymeric film-forming matrix, based on the total mixture of the constituents of the reactive adhesive film. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Reactive Monomer or Reactive Resin

As used herein, the reactive monomer or reactive resin is to denote a monomer or resin which is capable in particular of radical chain polymerization.

According to the invention, a suitable reactive monomer is chosen from the group consisting of: acrylic acid, acrylic acid esters, methacrylic acid, methacrylic acid esters, vinyl compounds and/or oligomeric or polymeric compounds having carbon-carbon double bonds.

In a preferred embodiment, the reactive monomer is one or more representatives chosen from the group consisting of: methyl methacrylate (CAS No. 80-62-6), methacrylic acid (CAS No. 79-41-4), cyclohexyl methacrylate (CAS No. 101-43-9), tetrahydrofurfuryl methacrylate (CAS No. 2455-24-5), 2-phenoxyethyl meth-acrylate (CAS No. 10595-06-9), di-(ethylene glycol)-methyl ether methacrylate (CAS No. 45103-58-0) and/or ethylene glycol dimethacrylate (CAS No. 97-90-5).

In a further preferred embodiment according to the invention, the reactive adhesive film comprises a mixture of cyclohexyl methacrylate, tetrahydrofurfuryl methacrylate, methacrylic acid and ethylene glycol dimethacrylate as the reactive monomers to be polymerized.

In a further preferred embodiment according to the invention, the reactive adhesive film comprises a mixture of methyl methacrylate, methacrylic acid and ethylene glycol dimethacrylate as the reactive monomers to be polymerized.

In a further preferred embodiment according to the invention, the reactive adhesive film comprises a mixture of 2-phenoxyethyl methacrylate and ethylene glycol dimethacrylate as the reactive monomers to be polymerized.

In a further preferred embodiment according to the invention, the reactive adhesive film comprises a mixture of di-(ethylene glycol)methyl ether methacrylate and ethylene glycol dimethacrylate as the reactive monomers to be polymerized.

Oligomeric mono-, di-, tri- and higher-functionalized (meth)acrylates can be chosen as the reactive resin(s). These are very advantageously used in a mixture with at least one reactive monomer.

According to the invention, each of these preferred embodiments can be combined with a thermoplastic polyurethane, such as, for example, Desmomelt 530®, as the polymeric film-forming matrix.

According to the invention, the amount of reactive monomer/monomers/reactive resin/resins is/are in the range of approximately from 20 to 80% by weight, preferably approximately from 40 to 60% by weight, based on the total mixture of the constituents of the reactive adhesive film. Most preferably, approximately from 40 to 50% by weight of the reactive monomer/monomers/reactive resin/resins, based on the total mixture of the constituents of the reactive adhesive film, is/are used. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Initiator, in Particular Radical Initiator

As used herein, the term initiator, in particular radical initiator or radical-forming substance (or also curing agent), denotes a compound which is able to initiate a polymerization reaction or crosslinking of the adhesive. However, the initiator, in particular radical initiator, plays a very small part in the reaction and consequently does not form a polymer component which determines the properties of the bond.

In the present invention, an initiator, in particular a radical initiator, is added to the at least one first reactive adhesive film of the adhesive film system.

Radical initiators are preferred. Any radical initiators known in the prior art can be used. Preferred radical initiators are peroxides, hydroperoxides and azo compounds.

In a particularly preferred embodiment according to the invention, the radical initiator is an organic peroxide. Particular preference is given to dimethylbenzyl hydroperoxide, which is also known as cumene hydroperoxide (CAS No. 80-15-9).

According to the invention, the amount of radical initiator is in the range of approximately from 3 to 30% by weight, preferably approximately from 8 to 15% by weight, based on the total mixture of the constituents of the reactive adhesive film. There are most preferably used approximately from 9 to 11% by weight of radical initiator, based on the total mixture of the constituents of the reactive adhesive film. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Activator

As used here, the term activator denotes a compound which at only very low concentrations permits for the first time or accelerates the process of polymerization. Activators can also be called accelerators.

In the present invention, an accelerator is added to the at least one second reactive adhesive film of the adhesive film system.

Suitable activators for use in the present invention, if a radically polymerizable system is to be activated, are selected, for example, from the group consisting of: an amine, a dihydropyridine derivative, a transition metal salt or a transition metal complex. In particular, tertiary amines are used for activating the radical-forming substance.

In a particularly preferred embodiment according to the invention, the activator is 3,5-diethyl-1,2-dihydro-1-phenyl-2-propylpyridine (also called PDHP, CAS No. 34562-31-7).

According to the invention, the amount of activator is in the range of from greater than 0 to approximately 40% by weight, preferably approximately from 15 to 25% by weight, based on the total mixture of the constituents of the reactive adhesive film. There is most preferably used approximately from 16 to 22% by weight, yet more preferably from 18 to 20% by weight, activator, based on the total mixture of the constituents of the reactive adhesive film. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Crosslinker

As used here, the term crosslinker denotes chemical compounds which are capable of providing linear molecule chains with reactive functional groups so that three-dimensionally crosslinked structures can form from the two-dimensional structures by the formation of intermolecular bridges.

Typical examples of crosslinkers are chemical compounds which have two or more identical or different functional groups within the molecule or at the two molecule ends and are consequently able to crosslink molecules of identical or different structures with one another. In addition, a crosslinker can react with the reactive monomer or reactive resin, as defined above, without the occurrence of a polymerization as such because, unlike the activator, as described above, a crosslinker can be incorporated into the polymer network.

In a particularly preferred embodiment according to the invention, ethylene glycol dimethacrylate (CAS No. 97-90-5) is used as the crosslinker and/or reactive monomer (see above).

Further Constituents of the Reactive Adhesive Film

The reactive adhesive films of the present invention can optionally comprise further additives and/or auxiliary substances which are known in the prior art. Mention may be made of, for example, fillers, colorants, nucleating agents, rheological additives, blowing agents, adhesion-enhancing additives (adhesion promoters, tackifier resins), compounding agents, plasticizers and/or anti-aging agents, light and UV stabilizers, for example in the form of primary and secondary antioxidants.

Reactive Adhesive Film

In a preferred embodiment according to the invention, the at least one first adhesive film (A) comprises a mixture of the following constituents: thermoplastic polyurethane, in particular Desmomelt 530®, cyclohexyl methacrylate, tetrahydrofurfuryl methacrylate, methacrylic acid, ethylene glycol dimethacrylate and cumene hydroperoxide.

In a further preferred embodiment according to the invention, the at least one first adhesive film (A) comprises a mixture of the following constituents: thermoplastic polyurethane, in particular Desmomelt 530®, methyl methacrylate, methacrylic acid, ethylene glycol dimethacrylate and cumene hydroperoxide.

In a further preferred embodiment according to the invention, the at least one first adhesive film (A) comprises a mixture of the following constituents: thermoplastic polyurethane, in particular Desmomelt 530®, 2-phenoxyethyl methacrylate, ethylene glycol dimethacrylate and cumene hydroperoxide.

In a further preferred embodiment according to the invention, the at least one first adhesive film (A) comprises a mixture of the following constituents: thermoplastic polyurethane, in particular Desmomelt 530®, di(ethylene glycol) methyl ether methacrylate, ethylene glycol dimethacrylate and cumene hydroperoxide.

Each of these preferred embodiments according to the invention comprises approximately from 20 to 80% by weight thermoplastic polyurethane, approximately from to 80% by weight reactive monomer(s) and approximately from 3 to 30% by weight cumene hydroperoxide, preferably approximately from 30 to 50% by weight thermoplastic polyurethane, approximately from 40 to 60% by weight reactive monomers and approximately from 8 to 15% by weight cumene hydroperoxide, based on the total mixture of the constituents of the reactive adhesive film.

In a preferred embodiment according to the invention, the at least one second adhesive film (B) comprises a mixture of the following constituents: thermoplastic polyurethane, in particular Desmomelt 530®, cyclohexyl methacrylate, tetrahydrofurfuryl methacrylate, methacrylic acid, ethylene glycol dimethacrylate and PDHP.

In a further preferred embodiment according to the invention, the at least one second adhesive film (B) comprises a mixture of the following constituents: thermoplastic polyurethane, in particular Desmomelt 530®, methyl methacrylate, methacrylic acid, ethylene glycol dimethacrylate and PDHP.

In a further preferred embodiment according to the invention, the at least one second adhesive film (B) comprises a mixture of the following constituents: thermoplastic polyurethane, in particular Desmomelt 530®, 2-phenoxyethyl methacrylate, ethylene glycol dimethacrylate and PDHP.

In a further preferred embodiment according to the invention, the at least one second adhesive film (B) comprises a mixture of the following constituents: thermoplastic polyurethane, in particular Desmomelt 530®, di(ethylene glycol) methyl ether methacrylate, ethylene glycol dimethacrylate and PDHP.

Each of these preferred embodiments according to the invention comprises approximately from 20 to 80% by weight thermoplastic polyurethane, approximately from 20 to 80% by weight reactive monomer(s) and from greater than 0 to approximately 40% by weight PDHP, preferably approximately from 30 to 50% by weight thermoplastic polyurethane, approximately from 40 to 60% by weight reactive monomer(s) and approximately from 15 to 25% by weight PDHP, based on the total mixture of the constituents of the reactive adhesive film.

As used herein, the total mixture of the constituents of the reactive adhesive film refers to the total amount of the polymeric film-forming matrix (a) that is used, the reactive monomer/monomers and/or reactive resin/resins (b), the reagent (c) and further components which are optionally present, which is obtained as the total (in % by weight).

The reactive adhesive film of the invention generally has a layer thickness in the range of from 5 to 500 µm, preferably approximately from 20 to 200 µm, more preferably approximately from 30 to 100 µm, yet more preferably approximately from 40 to 60 µm and particularly preferably approximately 50 µm. In order to produce greater layer thicknesses, it can be advantageous to laminate a plurality of adhesive film layers together.

The reactive adhesive film according to the invention is additionally characterized in that it preferably has properties of pressure sensitive adhesion. Pressure sensitive adhesive substances are defined according to Römpp (Römpp Online 2013, document identifier RD-08-00162) as viscoelastic adhesives whose set, dried film is permanently tacky and remains adhesive at room temperature. Pressure sensitive adhesion takes place immediately to almost all substrates by the application of gentle pressure. Gentle pressure here means a pressure of greater than 0 bar which is exerted for a period of more than 0 seconds.

Reactive Adhesive Film System

According to the invention, the first and second reactive adhesive films, as described above, are used for a reactive adhesive film system which is characterized in that the first reactive adhesive film (A), as well as comprising the film-forming matrix (a) and at least one reactive monomer or reactive resin (b), also comprises an initiator, in particular a radical initiator, and the second reactive adhesive, as well as comprising the film-forming matrix (a) and at least one reactive monomer or reactive resin (b), also comprises an activator.

There is additionally provided according to the invention a reactive adhesive film system comprising two or more reactive adhesive films, as defined above, characterized in that a first reactive adhesive film (A) comprises an initiator, in particular a radical initiator, and a second reactive adhesive film (B) comprises an activator, and the two reactive adhesive films (A) and (B) are each present alternately.

The first and second reactive adhesive films (A) and (B) crosslink and cure as soon as they are brought into contact over a large area under moderate pressure, in particular from 0.5 to 3 bar, at temperatures in the range of from room temperature to 100° C. The mentioned moderate pressure is in particular to be achievable by hand. According to the invention, the contact time is from a few minutes to a few hours, depending on the temperature. The pressure can be applied mechanically or manually.

If the two reactive adhesive films (A) and (B), as described above, are applied beforehand to the substrates to be bonded, permanent bonding of the substrates occurs as a result of the above-described crosslinking. Alternatively, adhesive film (A) can first be applied to the first substrate to be bonded, and adhesive film (B) can be applied to adhesive film (A). The second substrate to be bonded is then applied to adhesive film (B).

The adhesive films (A) and (B) can be identical as regards their geometry—for example their layer thickness—and/or as regards their chemical basis—for example film-forming matrix, monomers—apart from the components initiator and activator, so that a symmetrical adhesive film system is obtained. The geometry of the two adhesive films (A) and (B) and/or their chemical basis—in particular the nature of the film-forming matrix and/or the monomers used—can also be chosen to be different.

The adhesive films (A) and (B) very preferably each have a thickness in the region of up to 500 µm, for example film thicknesses of 20 µm, 50 µm, 100 µm, 250 µm, 270 µm or 500 µm. Adhesive films having thicknesses in the range of from 5 to 200 µm are very preferably used. The thicknesses of the two adhesive films of the adhesive film system can be chosen to be identical, or adhesive films of different thicknesses are used, in the second case the two adhesive films advantageously each have, independently of one another, a thickness in the region of up to 500 µm, preferably from 20 µm to 200 µm. In the case of non-symmetrical films, the initiator-containing film can be the thicker film and the activator-containing film can be the thinner film, but it is also possible for the initiator-containing film to be the thinner film and the activator-containing film to be the thicker film.

The adhesive films (A) and (B) can also be identical in terms of the additives that are optionally present or they can differ in terms of the type and/or amount of the additives.

By means of different symmetries, the adhesive films can outstandingly be optimized in respect of the substrate surface to which they are to be bonded.

Furthermore, the reactive adhesive film system according to the invention can comprise further films, layers, adhesives as well as permanent or temporary backings.

Suitable backing materials are known to the person skilled in the art in the field. For example, films (polyesters, PET, PE, PP, BOPP, PVC, polyimides), nonwovens, foams, woven fabrics and/or fabric foils can be used as permanent backings. Temporary backings should be provided with a release layer, wherein the release layer generally consists of a silicone release coating or a fluorinated release coating or is polyolefinic in nature (HDPE, LDPE).

The adhesive film (A) or the adhesive film (B) or both adhesive films can in turn be provided with one or more—in particular transparent—backings in order to increase their inherent stability. Foils and papers can likewise be used for this purpose, as well as non-crimped fabrics, woven fabrics and knitted fabrics; very advantageously, these materials should be permeable to the monomers and/or initiator or activator, for example they should have a wide-meshed structure. The surfaces of the backing materials can be pretreated chemically and/or physically, independently of one another, so that particularly good anchoring of the matrix to the backing material can be achieved.

It may be necessary for the surfaces of the substrates to be bonded to be pretreated by a physical, chemical and/or physico-chemical process. The application of a primer or of an adhesion promoter composition, for example, is advantageous here.

In particular in order to bridge gaps between the substrate surfaces or to compensate for unevenness in the substrate surfaces, it can be desirable to use particularly thick adhesive film systems. There can be used for this purpose, for example, adhesive film systems that consist of three or more adhesive films, for example of the type (A)-(B)-(A), (B)-(A)-(B), (A)-(B)-(A)-(B), (B)-(A)-(B)-(A), wherein these layer sequences can in principle be continued as desired. Instead of identical adhesive films of type (A) or type (B), they can also be varied in terms of their concrete composition, for example of type (A)-(B)-(A'), (B)-(A)-(B'), (A)-(B)-(A')-(B'), (B)-(A)-(B')-(A'), wherein these layer sequences too can in principle be continued as desired. The geometries (thicknesses, etc.) of the individual layers (A) and/or (B) can be identical or chosen independently of one another. The individual layers are in particular brought into contact only for bonding.

Thick adhesive film systems can also be produced in the following manner: an adhesive film component on at least one side of a backing material of any desired thickness—for example of a foam—has an adhesive layer of type (A) or of type (B), which for bonding is brought into contact with the second adhesive film required for the reaction. This can be present as a single layer or can be part of a foam or of a multi-layer system. The second side of the backing material can be bonded in the same manner—that is to say likewise via a two- or multi-layer adhesive film system according to the invention, but in principle also via a self-adhesive composition, a liquid adhesive or in another manner. Here too, symmetrical and non-symmetrical structures can be produced.

Substrates

Suitable substrates which are suitable for bonding via the reactive adhesive film system according to the invention are metals, glass, wood, concrete, stone, ceramics, textiles and/or plastic materials. The substrates to be bonded can be identical or different.

In a preferred embodiment, the reactive adhesive film system according to the invention is used for bonding metals, glass and plastic materials. In a particularly preferred embodiment according to the invention, polycarbonates and anodized aluminum are bonded.

The metal substrates to be bonded can generally be manufactured from any common metals and metal alloys. Metals such as, for example, aluminum, stainless steel, steel, magnesium, zinc, nickel, brass, copper, titanium, iron-containing metals and alloys are preferably used. The parts to be bonded can additionally be composed of different metals.

Suitable plastic substrates are, for example, acrylonitrile-butadiene-styrene copolymers (ABS), polycarbonates (PC), ABS/PC blends, PMMA, polyamides, glass fiber reinforced polyamides, polyvinyl chloride, polyvinylene fluoride, cellulose acetate, cycloolefin copolymers, liquid crystal polymers (LCP), polylactide, polyether ketones, polyetherimide, polyethersulfone, polymethacrylmethylimide, polymethylpentene, polyphenyl ether, polyphenylene sulfide, polyphthalmide, polyurethanes, polyvinyl acetate, styrene-acrylonitrile copolymers, polyacrylates and polymethacrylates, polyoxymethylene, acrylic ester-styrene-acrylonitrile copolymers, polyethylene, polystyrene, polypropylene and/or polyesters, such as, for example, polybutylene terephthalates (PBT) and/or polyethylene terephthalate (PET).

Substrates can be painted, printed, metallized or sputtered.

The substrates to be bonded can have any desired form which is required for the use of the resulting composite. In the simplest form, the substrates are flat. In addition, three-dimensional substrates, which are sloping, for example, can also be bonded using the reactive adhesive film system according to the invention. The substrates to be bonded can also have a wide variety of functions, such as, for example, casing, viewing window, stiffening elements, etc.

APPLICATION EXAMPLES

Some advantageous application examples for the adhesive film system according to the invention will be described in the following, without implying any limitation.

The adhesive film systems according to the invention are also very advantageously suitable for bonding sensitive substrates. This is the case, for example, in the automotive field and in the electronics field, to mention only two fields as examples.

Accordingly, the adhesive film system according to the invention is outstandingly suitable for a large number of bonding applications in the automotive field. One example is the construction of vehicle bodies. In particular the bonding of steel to steel, steel to glass fiber reinforced plastics (SMC, "sheet molded compounds"), steel to organic sheet (fiber composite materials), steel to aluminum (in particular lightweight aluminum parts), steel to magnesium (in particular lightweight magnesium parts), steel to polyamide (in particular glass fiber reinforced polyamide), steel to carbon fiber reinforced plastics (CRP), steel to glass, steel to ceramics-coated glass can outstandingly be carried out. The adhesive film system according to the invention is also outstandingly suitable when the metals from the above-mentioned list are coated, for example by cathodic dip coating or after they have been fully painted to the top coat, as can be the case, for example, after passing through the painting line during vehicle body manufacture.

An advantage of bonding with the adhesive film system according to the invention, in particular also for the material combinations mentioned above, is the possibility of achieving outstanding bond strengths at only low bonding temperatures. When higher temperatures act on different materials, pronounced differences in their longitudinal extension can occur, which can be avoided if the adhesive bond cures at low room temperatures, in particular at room temperature (23° C.) The adhesive film systems according to the invention are thus particularly suitable for substrates that are to be bonded with little pressure and/or at a low reaction temperature, such as materials with sensitive surfaces or surface coatings, fragile materials, temperature-sensitive materials; such as in particular plastic materials.

The adhesive film systems according to the invention can also outstandingly be used in bonding processes in which high pressures and/or high temperatures cannot be achieved for process-related reasons. This is likewise the case when high pressures and/or high temperatures are no longer provided in the process sequence, although they would technically be realizable.

Examples are the bonding of motor vehicle rear-view mirrors in the mirror mounting or the bonding of the mirror mountings in vehicles, for example to the windshield.

For this application in particular, it is advantageous if bonding is carried out by means of a method in which the composite is additionally pre-fixed by further fixing means, such as, for example, self-adhesive tapes, until the reactive adhesive film system has cured. Such a method will be described hereinbelow according to the invention.

The adhesive film systems according to the invention produce no aggressive substances, for example acids, and generally also no volatile fractions upon curing. However, that is frequently the case with conventional reactively curing systems. The adhesive film systems according to the invention are therefore also outstandingly suitable when materials are to be bonded that would be damaged or destroyed by aggressive substances, for example painted surfaces, for example of vehicles, see above. This advantage has an effect both in the case of bonding to the paint surfaces but also when bonding does not take place directly to the paint surface but the substances could nevertheless come into contact with or act on the paint. The adhesive film systems according to the invention are also outstandingly suitable for bonding in applications in which the volatile constituents would have a negative effect upon use of the bonded products, for example through slow evaporation. This can be the case, for example, if such evaporation would cause health problems for the user of the products or where surface qualities are impaired by deposits of the evaporated substances, for example becoming dull, cloudy, opaque and/or greasy, or the like.

The adhesive film systems according to the invention also offer advantages where bonding is to be achieved on moving parts, for example in the bonding of components in the automotive field, because of the high strength which can be achieved. Examples are the bonding of decorative elements to motor vehicles or the bonding of or on moving—for example rotating—parts, which are exposed to particularly high mechanical stress.

An advantage of the adhesive film system according to the invention over radiation-curing systems can also arise wherever the bond sites are difficult to access and/or have complex geometries and/or cannot be reached by beams, for example when one or both of the substrates are not transparent.

Method for Producing a Reactive Adhesive Film

The reactive adhesive films according to the invention are produced by the method described below:

In a first step, the ingredients are dissolved or finely distributed in one or more solvent(s) and/or water. Alternatively, no solvent and/or water is necessary because the ingredients are already wholly soluble in one another (optionally under the action of heat and/or shear). Suitable solvents are known in the art, wherein solvents in which at least one of the ingredients has good solubility are preferably used. Acetone is particularly preferred.

As used herein, the term ingredient includes the polymeric film-forming matrix, at least one reactive monomer or reactive resin, a reagent selected from an initiator, in particular a radical initiator, or an activator, and optionally further additives and/or auxiliary substances, as defined above.

The dissolved or finely distributed ingredients are then mixed in a second step. Conventional stirring devices are used to produce the mixture. The solution is optionally additionally heated. The ingredients are optionally dissolved or finely distributed and mixed simultaneously.

Subsequently, in a third step, a release paper, a backing material or a pressure sensitive adhesive is coated with the mixture of the dissolved or finely distributed ingredients according to step 2. The coating is carried out by the conventional techniques known in the art.

After the coating, the solvent is removed by evaporation in a fourth step.

The reactive adhesive film can optionally be wound into a roll in a further step.

For storage, the reactive adhesive films according to the invention are covered with a release liner or release paper.

Alternatively, the reactive adhesive films according to the invention are produced in a solvent-free manner by extrusion, hot melt die coating or calendering.

Kit for Providing a 2-component Adhesive System in Film Form According to the Invention There is additionally provided according to the invention a kit for providing a reactive 2-component adhesive system in film form. The kit comprises at least one first reactive adhesive film (A) which comprises an initiator, in particular a radical initiator, as described above, and at least one second reactive adhesive film (B) which comprises an activator, as described above.

The kit according to the invention is typically used as follows:

The at least one first adhesive film (A) is applied to a surface of a substrate to be bonded. In addition, the at least one second adhesive film (B) is applied to a surface of a second substrate to be bonded. Adhesive film (A) and adhesive film (B) are brought into contact and left in contact for pressing times in the range of from a few minutes to several hours, at temperatures from room temperature to 100° C., whereby the polymerization reaction starts and the adhesive cures. Alternatively, it is also possible to apply the at least one second adhesive film (B) to the first adhesive film (A) and only then to apply thereto the surface of a second substrate to be bonded.

The method described above can optionally be repeated in order thus to achieve bonding of the layers substrate-(A)-(B)-(A)-(B)-substrate or substrate-(B)-(A)-(B)-substrate or substrate-(A)-(B)-(A)-substrate, etc. This can be advantageous if the properties of pressure sensitive adhesion between the substrates to be bonded and the first and second adhesive films (A) and (B) differ.

Method of Using the Adhesive Film System According to the Invention with Pre-Fixing by Further Fixing Means It is generally expected that the ultimate strength of the bond produced with the reactive adhesive film system according to the invention will have the same or at least similar values to those of the liquid or pasty structural adhesives already known. At the same time, however, it is desirable for the adhesive system used to be easy to handle, combined with good instant adhesion and good inherent stability (attributable to the cohesion of the adhesive films, in particular of the adhesive film matrix).

It is desirable for the bonding process if adequate fixing can be achieved shortly after the components have been joined within a few minutes, in particular less than one minute, in order to optimize process reliability. Reactive adhesive composition systems frequently require a longer time to achieve adequate bond strength in order that it is ensured that the composite does not come apart again without additional stabilizing measures or in order that the substrates are not displaced relative to one another. In conventional processes, complex holding measures for the composite are therefore frequently required. For example, in automotive production, long times until a firm bond is achieved are problematic because the vehicle is moved from station to station in the assembly shop on the assembly line and additional supports for the components would be disruptive. High demands are also present when joining components, composites and modules, such as, for example, the fixing of the interior rear-view mirror to the inside of the windshield. The rear-view mirror casings are conventionally mounted by means of a metal foot, for example of steel, and the metal foot itself is bonded to the windshield, that is to say conventionally to glass. In practice, bonding is frequently achieved via heat-activatable adhesive tapes, wherein it is necessary that the metal foot, after being applied using the adhesive tape, is additionally fixed to the windshield by means of clamps in order subsequently to be introduced into the heating chamber with the entire windshield, or in order to heat the bonding site locally to the required temperature for curing of the heat-activatable adhesive system, in each case until the curing process is complete.

Depending on the choice of the components of the adhesive film system according to the invention (such as the type and amount of monomers, initiators, activators), the time to adequate curing, in particular to a state which is sufficient to hold a component independently, can also be from several minutes to 2 to hours. The above-mentioned problem can accordingly also arise in the bonding of parts to be joined by means of the adhesive film system according to the invention, in particular when the system or its constituents—such as the individual adhesive films—do not have adequate tackiness.

A solution to this problem has been found in a method for bonding two join partners together, in which the join partners are fixed together by means of a self-adhesive bonding system and ultimately bonded by means of a reactive adhesive film system as is described as being according to the invention within the scope of this specification.

Advantageously according to the invention, in this method, simultaneously with the joining of the composite of the two join partners that is to be bonded and the two adhesive films (A) and (B), or the multi-layer adhesive film system, there are provided between the two join partners one or more self-adhesive bonding systems, in particular self-adhesive bonding systems that have sufficient instant bond strength to reliably hold the bonded composite together. Instant adhesive strength here means the bond strength that can be achieved within a few minutes, preferably within one minute. In particular, the self-adhesive bonding systems have high initial adhesion and good cohesion.

The self-adhesive bonding systems do not have to achieve the required ultimate bond strength of the composite, because they are to serve to hold the composite only until the reactive adhesive system has cured. The ultimate strength of the bond is then achieved by the cured adhesive system according to the invention.

The self-adhesive bonding systems are preferably used in the form of self-adhesive films which adhere on both sides (single-layer or multi-layer self-adhesive tapes, having one or more backing layers or without backing layers).

Self-adhesive bonding systems, which are also referred to as self-adhesive compositions or pressure sensitive adhesives (PSA), are in particular polymeric compositions which—optionally by the addition of suitable further components, such as, for example, adhesive resins—are permanently tacky and permanently adhesive at the application temperature (unless defined otherwise, at room temperature) and adhere to a large number of surfaces on contact, in particular adhere instantly (have a so-called "tack" [adhesiveness or contact adhesiveness]). They are capable, even at the application temperature without activation by solvents or by heat—optionally by the influence of a certain pressure—of wetting a substrate to be bonded sufficiently that interactions are able to form between the composition and the substrate that are sufficient for adhesion. The particular properties of the pressure sensitive adhesives are due inter alia in particular to their viscoelastic properties.

Pressure sensitive adhesives can in principle be produced on the basis of polymers of different chemical natures. The properties of pressure sensitive adhesion are influenced inter alia by the type and relative proportions of the monomers used in the polymerization of the polymers on which the pressure sensitive adhesive is based, the mean molar mass and molar mass distribution thereof, and by the type and amount of the substances which are added to the pressure sensitive adhesive, such as adhesive resins, plasticizers and the like.

In order to achieve the viscoelastic properties, the monomers constituting the polymers on which the pressure sensitive adhesive is based, and also the further components of the pressure sensitive adhesive that are optionally present, are in particular so chosen that the pressure sensitive adhesive has a glass transition temperature (according to DIN 53765) below the application temperature (that is to say conventionally below room temperature). By means of suitable measures for increasing cohesion, such as, for example, crosslinking reactions (formation of bridge-forming linkages between the macromolecules), the temperature range in which a polymer composition exhibits tacky properties can be enlarged and/or displaced. The application range of the pressure sensitive adhesives can thus be optimized by an adjustment between flowability and cohesion of the composition.

The double-sided self-adhesive tapes which can be used are in principle not limited as regards their chemical nature. There are advantageously used those which are based on acrylates or polyurethanes, optionally in foamed form. These materials generally have good aging resistance. There can also be used, for example, double-sided polyethylene-polypropylene foam tapes with acrylate adhesives, in particular when instant adhesion does not require too high strengths.

Combination adhesive tapes are very advantageously used for joining the parts to be bonded. Such tapes have one or more of the adhesive film systems according to the invention as well as one or more self-adhesive films. The adhesive film systems according to the invention and the self-adhesive films can in particular be present in the form of sections, blanks, die-cut pieces or other flat shaped bodies (together referred to below as shaped bodies) on a temporary backing which serves for application and is removed again before the join partners are finally joined by means of the adhesive systems.

The shaped bodies of reactive adhesive film according to the invention can be in such a form that they are produced from one of the adhesive films (A) or (B) or from only some of the layers of the above-described multi-layer adhesive film systems. During application, the corresponding shaped bodies are then applied to the corresponding positions of one of the bodies to be joined. It is advantageous to provide a further adhesive tape (referred to below as the corresponding adhesive tape) in which the corresponding second adhesive films required for the reaction, or the additional layers of the multi-layer adhesive film system, are arranged as a mirror image and can accordingly be applied to the second join partner so that they are aligned with one another when the join partners are brought into contact.

However, it is also conceivable to design the combination adhesive tapes in such a manner that the shaped bodies of adhesive film system are in such a form that the adhesive films (A) and (B) are on top of one another—in particular congruently—and, during application of the shaped bodies, one adhesive film is placed onto the surface of the shaped body and the second adhesive film is exposed on the first adhesive film. Contact with the second body to be joined is then achieved when the two bodies to be joined are brought together. Likewise, in the case of multi-layer adhesive film systems according to the invention, the entire multi-layer system can already be positioned.

It is, however, also possible according to the invention to place shaped bodies of self-adhesive film on one of the reactive adhesive films (A) or (B) so that, when or after the join partners are brought together, at least one of the substrate surfaces can be in contact with the regions of the reactive adhesive film that are not covered by the shaped bodies of self-adhesive film and with the shaped bodies of self-adhesive film. It can be advantageous here likewise to provide a corresponding adhesive tape with shaped bodies of the second adhesive film required for the reaction, in which the shaped bodies of the second adhesive tape have the geometry of the regions that are not covered of the first adhesive film of the first adhesive tape and are arranged mirror-symmetrically.

The combination adhesive tapes and/or the corresponding adhesive tapes that are optionally provided can be prefabricated so that the corresponding adhesive regions (adhesive films or adhesive film systems according to the invention, self-adhesive films, regions available for bonding) are already correspondingly geometrically arranged at the intended position during bonding. They can be supplied and used, for example, as combination die-cut pieces or as a so-called "family sheet", that is to say in the form of an adhesive tape with all the necessary individual die-cut pieces. The geometric configuration and arrangement of the reactive adhesive film regions and of the self-adhesive regions is not limited. The shaped bodies of self-adhesive film and the shaped bodies of adhesive film can be arranged touching or spaced apart from one another.

Examples are circular self-adhesive regions around which one or more annular regions of reactive adhesive films are arranged, or square self-adhesive regions around which one or more square frame-like regions of reactive adhesive films are arranged. The self-adhesive regions and the regions of reactive adhesive films can be arranged in contact or spaced apart.

Combination adhesive tapes can be supplied, for example, as a roll of adhesive tape. Particularly advantageous is a roll of adhesive tape in which one of the adhesive films (A) or (B) according to the invention is in the form of a continuous tape on which there is provided at regular intervals a shaped body of self-adhesive tape of defined length (for example every 1 to 10 cm).

The combination adhesive tapes and the corresponding adhesive tapes that are optionally present are preferably in such a form that the thickness of the self-adhesive shaped bodies, or the thickness of the adhesive tape in the regions in which the exposed adhesive tape surface is formed of self-adhesive shaped bodies, and the thickness of the totality of the reactive adhesive film system in the reactively bonding regions (that is to say the sum of all adhesive films of type (A) and of all adhesive films of type (B) as well as any further layers present, such as backings and the like, regardless of whether they are introduced via the combination adhesive tape itself or via the corresponding adhesive tape at the respective position of the join site) are substantially identical so that, when the join partners are joined by means of the combination adhesive tapes, contact takes place both in the regions of the reactive adhesive film system and in the self-adhesive regions.

If conditions allow pressure to be used, for example applied pressures of more than one bar, it can also be advantageous to make the total thickness of the self-adhesive regions smaller than the total thickness of the reactive adhesive film before pressing. For example, the self-adhesive regions can have a thickness which is up to 10% smaller (for example from 5 to 10% smaller) than the total thickness of the reactive adhesive film. During bonding, contact in the self-adhesive regions can then be carried out under pressure, by pressing the reactive adhesive film system together. Instant fixing is thereby achieved, and the resulting pressure on the reactive adhesive film system is maintained even after the external pressure source has been removed and can serve to facilitate the curing reaction.

The above-mentioned procedures simplify the application process for the customer in that the component is immediately held in position by the self-adhesive tape. As a result, the reactive adhesive film system according to the invention has sufficient time to cure and to ensure ultimate strength.

As a result, for example in the bonding of the interior mirror to the windshield in a car, installation in the production line is even possible. In addition, the bonding process to the windshield before fitting into the car can be significantly shortened for the supplier, energy can be saved by omitting heat curing, and the risk that the temperature load will damage the windshield can additionally be avoided.

Of course, the method described in this section for using the adhesive film system according to the invention with pre-fixing by further fixing means can also be carried out for all other fields of application.

Composite

Finally, there is provided according to the invention a composite which is bonded by means of the reactive adhesive film system according to the invention, as defined above, or by the kit according to the invention, as defined above.

EXPERIMENTAL PART

The examples which follow serve to illustrate the present invention but are not to be interpreted as limiting the scope of protection.

Example 1

A 20% solution of the film-forming matrix in acetone (PU solution) is first prepared. To that end, 120 g of Desmomelt 530® and 480 g of acetone are weighed into a screw top jar and the screw top jar is then closed. The Desmomelt 530® is dissolved completely by rolling the screw top jar on a roller bench for several days. The operation lasts approximately from one to seven days, depending on the rolling speed. Alternatively, the acetonic solution can also be prepared by stirring the Desmomelt 530® granules in acetone by means of a commercial laboratory stirrer.

Production of the First Reactive, Pressure-sensitively Adhering Adhesive Film (A) Comprising a Radical Initiator 200.0 g of the 20% solution of Desmomelt 530® in acetone are mixed with 47.0 g of 2-phenoxyethyl methacrylate, 3.0 g of ethylene glycol dimethacrylate and 10.0 g of cumene hydroperoxide for 10 minutes by means of a commercial laboratory stirrer. The resulting homogeneous mixture is applied to a siliconized polyester film (release paper) by means of a commercial laboratory coating table (for example from SMO (Sondermaschinen Oschersleben GmbH)) having a coating knife. The acetone is then evaporated off for 10 minutes at 60° C. in a circulating air drying cabinet. The gap width during coating is so adjusted that, after evaporation of the solvent, a 50 μm thick film is obtained. The resulting pressure-sensitively adhering adhesive film (A) is covered with a second siliconized polyester film and stored until bonding.

Production of the Second Reactive Pressure-sensitively Adhering Adhesive Film (B) Comprising an Activator 200.0 g of the 20% solution of Desmomelt 530® in acetone are mixed with 37.0 g of 2-phenoxyethyl methacrylate, 3.0 g of ethylene glycol dimethacrylate and 20.0 g of PDHP for 10 minutes by means of a commercial laboratory stirrer. The resulting homogeneous mixture is applied to a siliconized polyester film (release paper) by means of a commercial laboratory coating table having a coating knife. The acetone is then evaporated off for 10 minutes at 60° C. in a circulating air drying cabinet. The gap width during coating is so adjusted that, after evaporation of the solvent, a 50 μm thick film is obtained. The resulting pressure-sensitively adhering adhesive film (B) is covered with a second siliconized polyester film and stored until bonding.

The percentage compositions of films A and B and the starting solutions are given in the following table, together with the described weighed portions:

|  | Wt. % solid | Weighed portion (g) with solvent | Wt. % with solvent |
|---|---|---|---|
| Example 1, solution and film A | | | |
| PU solution | 40.0 | 200.0 | 76.92 |
| 2-Phenoxyethyl methacrylate | 47.0 | 47.0 | 18.08 |
| Ethylene glycol dimethacrylate | 3.0 | 3.0 | 1.15 |
| Cumene hydroperoxide | 10.0 | 10.0 | 3.85 |
| Total | 100.0 | 260.0 | 100.00 |
| Example 1, solution and film B | | | |
| PU solution | 40.0 | 200.0 | 76.92 |
| 2-Phenoxyethyl methacrylate | 37.0 | 37.0 | 14.23 |
| Ethylene glycol dimethacrylate | 3.0 | 3.0 | 1.15 |
| PDHP | 20.0 | 20.0 | 7.69 |
| Total | 100.0 | 260.0 | 100.00 |

Example 2

Analogously to Example 1, the first and second reactive, pressure-sensitively adhering adhesive films (A) and (B) are produced in this example with the following concentrations:

|  | Wt. % solid | Weighed portion (g) with solvent | Wt. % with solvent |
|---|---|---|---|
| Example 2, solution and film A | | | |
| PU solution | 40.0 | 200.0 | 76.92 |
| Di(ethylene glycol)-methyl ether methacrylate | 47.0 | 47.0 | 18.08 |
| Ethylene glycol dimethacrylate | 3.0 | 3.0 | 1.15 |
| Cumene hydroperoxide | 10.0 | 10.0 | 3.85 |
| Total | 100.0 | 260.0 | 100.00 |
| Example 2, solution and film B | | | |
| PU solution | 40.0 | 200.0 | 76.92 |
| Di(ethylene glycol)-methyl ether methacrylate | 37.0 | 37.0 | 14.23 |
| Ethylene glycol dimethacrylate | 3.0 | 3.0 | 1.15 |
| PDHP | 20.0 | 20.0 | 7.69 |
| Total | 100.0 | 260.0 | 100.00 |

Example 3

Analogously to Example 1, the first and second reactive, pressure-sensitively adhering adhesive films (A) and (B) are produced in this example with the following concentrations:

|  | Wt. % solid | Weighed portion (g) with solvent | Wt. % with solvent |
|---|---|---|---|
| Example 3, solution and film A | | | |
| PU solution | 43.8 | 219.0 | 79.58 |
| Methyl methacrylate | 35.4 | 35.4 | 12.86 |
| Methacrylic acid | 6.8 | 6.8 | 2.47 |
| Ethylene glycol dimethacrylate | 3.0 | 3.0 | 1.09 |
| Cumene hydroperoxide | 11.0 | 11.0 | 4.00 |
| Total | 100.0 | 275.2 | 100.00 |
| Example 3, solution and film B | | | |
| PU solution | 39.6 | 198.0 | 76.63 |
| Methyl methacrylate | 31.6 | 31.6 | 12.23 |
| Methacrylic acid | 6.2 | 6.2 | 2.40 |
| Ethylene glycol dimethacrylate | 2.6 | 2.6 | 1.01 |
| PDHP | 20.0 | 20.0 | 7.74 |
| Total | 100.0 | 258.4 | 100.00 |

Example 4

Analogously to Example 1, the first and second reactive, pressure-sensitively adhering adhesive films (A) and (B) are produced in this example with the following concentrations:

|  | Wt. % solid | Weighed portion (g) with solvent | Wt. % with solvent |
|---|---|---|---|
| Example 4, solution and film A | | | |
| PU solution | 47.3 | 236.5 | 81.78 |
| Cyclohexyl methacrylate | 13.0 | 13.0 | 4.5 |
| Tetrahydrofurfuryl methacrylate | 13.0 | 13.0 | 4.5 |
| Methacrylic acid | 6.7 | 6.7 | 2.32 |
| Ethylene glycol dimethacrylate | 10.0 | 10.0 | 3.45 |
| Cumene hydroperoxide | 10.0 | 10.0 | 3.45 |
| Total | 100.0 | 289.2 | 100.00 |
| Example 4, solution and film B | | | |
| PU solution | 42.0 | 210.0 | 78.36 |
| Cyclohexyl methacrylate | 11.6 | 11.6 | 4.31 |
| Tetrahydrofurfuryl methacrylate | 11.6 | 11.6 | 4.31 |
| Methacrylic acid | 6.0 | 6.0 | 2.24 |
| Ethylene glycol dimethacrylate | 8.8 | 8.8 | 3.32 |
| PDHP | 20.0 | 20.0 | 7.46 |
| Total | 100.0 | 268.0 | 100.00 |

Preparation of Samples for the Push-out Test

Round die-cut pieces having a diameter of 21 mm were punched out of the adhesive films (A) and (B) to be tested, which were covered on both sides with a release paper (also release liner). The release papers were then removed from one side of the die-cut piece, and the first die-cut piece (A) was placed accurately on a round test disk ("disk") likewise having a diameter of 21 mm. The die-cut piece (A) adhered to the "disk". Test specimens with test discs of polycarbonate, glass and those with test discs of steel were prepared in the same manner (see table). The release paper still remaining on the first die-cut pieces (A) was then removed. The second adhesive film (B) to be tested was placed with the uncovered side on the die-cut piece (A) adhering to the disk, so that the second die-cut piece (B) adhered to the first die-cut piece (A).

The second substrate was a square perforated plate made of polycarbonate (PC), glass or steel (see table); side lengths in each case were 40 mm, with a centrally arranged round hole (hole diameter 9 mm) in the square plate.

For bonding, the last release paper still remaining on the second die-cut piece (B) was removed, so that the second die-cut piece (B) was exposed. In a test variant, the die-cut piece A freed of the release liner was again placed on the exposed die-cut piece B, so that the die-cut piece sequence A-B-A was obtained. The remaining release liner was then removed from the die-cut piece A, so that die-cut piece A was exposed and a bond test piece—A-B-A-test piece could be produced (see table).

Bonding for the Push-out Test

The round test specimen was positioned with the exposed side on the perforated plate so that the center of the round test specimen and the center of the hole in the perforated plate were located one above the other. The composite held together by the tackiness of the first and second die-cut pieces (A) and (B) and consisting of the square perforated plate, the second die-cut piece (B), the first die-cut piece (A) and the disk or, in a test variant, consisting of the square perforated plate—die-cut piece A-die-cut piece B-die-cut piece A—disk, was placed in a drying cabinet at 60° C. so that the square perforated plate was on the bottom. A weight of 2 kg was placed on the disk. The composite remained in the drying cabinet for 60 minutes at 60° C. under the permanent pressure of the weight. The weight was then removed and the composite was taken out of the oven. A curing reaction thereby occurred within the die-cut pieces, resulting in enhanced adhesion between the die-cut pieces and the test specimens. Bonding was accordingly achieved with a strength which significantly exceeded the original strength achieved by pressure sensitive adhesion. The weight was then removed and the now consolidated composite was taken out of the oven. The composite was then stored for 24 hours at 23° C. and 50% relative humidity. The push-out test was then carried out.

As an alternative, instead of the described curing at 60° C., curing was also carried out at 23° C. (curing temperature) and 50% relative humidity (see table). To that end, the composite held together by the tackiness of the die-cut pieces was pressed together with a weight of 2 kg for 24 hours (pressing time) in a test arrangement as described in the case of the 60° C. curing.

Push-out Test

The push-out test gives information about the bond strength of an adhesive product which adheres on both sides in the direction of the normal of the adhesive layer. To that end, pressure was applied to the round test piece perpendicularly through the hole in the perforated plate at a constant rate of 10 mm/minute by means of a mandrel clamped in a tensile tester (that is to say parallel to the normal vector on the test piece plane; centered centrally at the middle of the hole) until the bond loosened sufficiently that a pressure drop of 50% was recorded. The pressure acting immediately before the pressure drop is the maximum pressure $P_{max}$. This value corresponds to the push-out value [N/mm$^2$] indicated in the table. All the measurements were carried out in a temperature-controlled chamber at 23° C. and 50% relative humidity.

Preparation of Specimens for Determining the Tensile Shear Strength

Rectangular die-cut pieces measuring 2.0 cm×1.0 cm were punched out of the first and second films (A) and (B) to be tested, each of which was covered with a release paper on both sides. The release papers were then removed from one side of each die-cut piece and the first die-cut piece (A) was placed flush on the end of a test piece measuring 10.0 cm×2.0 cm×0.3 cm. The die-cut piece adhered to the test piece. Test specimens with test pieces of polycarbonate, glass and with test pieces of steel were prepared in that manner (see table). The release papers still remaining on the first die-cut pieces (A) were then removed. The second die-cut piece (B) to be tested was placed with its uncovered side flush on the first die-cut piece (A) adhering to the test piece, so that the second die-cut piece (B) adhered to the first die-cut piece (A).

The second test piece had the same dimensions as the first and was likewise made of polycarbonate (PC), glass or steel (see table); for bonding, the last release paper still remaining on the second die-cut piece (B) was removed so that the second die-cut piece (B) was exposed. In a test variant, a first die-cut piece (A) freed of release paper was again placed on the exposed second die-cut piece (B) so that the die-cut piece sequence (A)-(B)-(A) was obtained. The remaining release paper was then again removed from the die-cut piece (A), so that the first die-cut piece (A) was exposed and a bond test piece—(A)-(B)-(A)-test piece could be produced (see table).

Bonding for Determining the Tensile Shear Strength

The second test piece was placed flush with one end on the second die-cut piece (B) so that, as described in DIN EN 1465, an overlapping bond held together by the tackiness of the two die-cut pieces (A) and (B) was obtained. The length of overlap was 1.0 cm. The area of overlap was 2.0 cm². The overlapping composite, held together by the tackiness of the die-cut pieces (A) and (B), consisting of first test piece—die-cut piece (B)-die-cut piece (A)—second test piece or, in a test variant, consisting of first test piece—die-cut piece (A)-die-cut piece (B)-die-cut piece (A)—second test piece, was placed in a drying cabinet at 60° C. (curing temperature). A weight of 2 kg was placed in the middle of the second test piece in the region of the overlap. The composite remained in the drying cabinet for 60 minutes at 60° C. under the permanent pressure of the weight (pressing time).

A curing reaction within the die-cut pieces thereby took place and enhanced adhesion was obtained between the die-cut pieces and with the test pieces. Bonding with a strength which significantly exceeded the original strength due to pressure sensitive adhesion was accordingly obtained. The weight was then removed and the now consolidated composite was taken out of the oven. The composite was then stored for 24 hours at 23° C. and 50% relative humidity. The tensile shear strength was then determined. In an alternative, instead of the described curing at 60° C., curing also took place at 23° C. (curing temperature) and 50% relative humidity (see table). To that end, the composite held together by the tackiness of the die-cut pieces was pressed together with a weight of 2 kg for 24 hours (pressing time) in a test arrangement as described for the 60° C. curing.

Determination of the Tensile Shear Strength

Determining the tensile shear strength of overlapping bonds gives information about the shear strength of an adhesive product which adheres on both sides. The determination was carried out according to DIN EN 1465 by means of a tensile tester. The test speed was 10 mm/minute. All the measurements were performed in a climate-controlled chamber at 23° C. and 50% relative humidity.

Results

Push-out Test

| | Die-cut piece combination | Pressing time/curing temperature | Push-out [N/mm²] | | |
|---|---|---|---|---|---|
| | | | PC/PC | Glass/glass | Steel/steel |
| Example 1 | A-B | 1 h/60° C. | 4.8 (K) | 1.0 (MB) | 4.2 (A) |
| | | 24 h/23° C. | 3.6 (K) | 0.9 (MB) | 3.5 (A) |
| | A-B-A | 1 h/60° C. | 2.8 (K) | 1.1 (MB) | 2.5 (K) |
| | | 24 h/23° C. | 2.2 (K) | 0.9 (MB) | 2.3 (K) |
| Example 2 | A-B | 1 h/60° C. | 4.3 (K) | 1.0 (MB) | 4.0 (A) |
| | | 24 h/23° C. | 2.0 (K) | 0.9 (MB) | 2.3 (K) |
| | A-B-A | 1 h/60° C. | 2.5 (K) | 0.9 (MB) | 2.2 (K) |
| | | 24 h/23° C. | 1.6 (K) | 0.8 (MB) | 2.0 (K) |
| Example 3 | A-B | 1 h/60° C. | 2.8 (K) | 0.7 (A) | 2.6 (A) |
| Example 4 | A-B | 1 h/60° C. | 1.7 (K) | 0.6 (A) | 1.6 (K) |

A = adhesive failure between die-cut piece and test piece.
K = cohesive failure within the die-cut piece composite.
MB = material failure of the test piece.

Tensile Shear Strength

| | Die-cut piece combination | Pressing time/curing temperature | Tensile shear strength [N/mm²] | | |
|---|---|---|---|---|---|
| | | | PC/PC | Glass/glass | Steel/steel |
| Example 1 | A-B | 1 h/60° C. | 8.8 (K) | 1.4 (MB) | 7.4 (A) |
| | | 24 h/23° C. | 6.6 (K) | 1.5 (MB) | 6.3 (A) |
| | A-B-A | 1 h/60° C. | 6.2 (K) | 1.5 (MB) | 6.2 (A) |
| | | 24 h/23° C. | 4.2 (K) | 1.5 (MB) | 5.6 (K) |
| Example 2 | A-B | 1 h/60° C. | 6.2 (K) | 1.4 (MB) | 7.1 (A) |
| | | 24 h/23° C. | 3.7 (K) | 1.5 (MB) | 4.8 (K) |
| | A-B-A | 1 h/60° C. | 4.9 (K) | 1.5 (MB) | 4.4 (K) |
| | | 24 h/23° C. | 3.2 (K) | 1.5 (MB) | 2.9 (K) |
| Example 3 | A-B | 1 h/60° C. | 4.0 (K) | 0.9 (A) | 4.7 (K) |
| Example 4 | A-B | 1 h/60° C. | 2.8 (K) | 1.0 (A) | 2.6 (K) |

A = adhesive failure between die-cut piece and test piece.
K = cohesive failure within the die-cut piece composite.
MB = material failure of the test piece.

These results show that it was possible, using the reactive adhesive films according to the invention or the reactive adhesive film system according to the invention, to bond two substrates (test pieces) at room temperature (24 hours) or 60° C. (1 hour) with a strength which significantly exceeded the original strength achieved by pressure sensitive adhesion. In addition, the resulting bond has high tensile shear strength, so that the resulting composite has high shock resistance.

Overall, the adhesive system according to the invention in film form thus permits improved bonding and, at the same time, improved usability.

The invention claimed is:

1. A solid-form reactive adhesive film, comprising:
   (a) an inert thermoplastic polyurethane film-forming matrix;
   (b) an at least one reactive monomer selected from the group consisting of methyl methacrylate, methacrylic acid, cyclohexyl methacrylate, tetrahydrofurfuryl methacrylate, 2-phenoxyethyl methacrylate, di(ethylene glycol)methyl ether methacrylate, and ethylene glycol dimethacrylate; and
   (c) a reagent selected from the group consisting of a radical initiator and an activator,
wherein the solid-form reactive adhesive film has pressure-sensitive adhesive properties.

2. The solid-form reactive adhesive film as claimed in claim 1, wherein the radical initiator is a peroxide.

3. The solid-form reactive adhesive film as claimed in claim 1, wherein the activator is an amine, a dihydropyridine derivative, a transition metal salt, or a transition metal complex.

4. The solid-form reactive adhesive film as claimed in claim 1, wherein:
   i) the inert thermoplastic polyurethane film-forming matrix is present at 20 to 80% by weight of the at least one reactive monomer; and
   ii) the radical initiator is present at 3 to 30% by weight.

5. The solid-form reactive adhesive film as claimed in claim 1, wherein:
   i) the inert thermoplastic polyurethane film-forming matrix is present at 20 to 80% by weight of the at least one reactive monomer); and
   ii) the activator is present at more than 0 to 40% by weight.

6. A solid-form reactive adhesive film system comprising two solid-form reactive adhesive films as claimed in claim 1, wherein the first solid-form reactive adhesive film comprises a radical initiator and the second solid-form reactive adhesive film comprises an activator.

7. A solid-form reactive adhesive film system comprising two or more solid-form reactive adhesive films as claimed in claim 1, wherein a first solid-form reactive adhesive film comprises a radical initiator and a second solid-form reactive adhesive film comprises an activator and these two solid-form reactive adhesive films are present alternately.

8. The solid-form reactive adhesive film system as claimed in claim 6, further comprising films, layers, adhesives, backings, release papers and/or release liners.

9. A method for bonding materials of metal, wood, glass and/or plastic materials, where said materials are bonded with the solid-form reactive adhesive film of claim 1.

10. A method for producing a solid-form reactive adhesive film comprising the steps of:
   1. dissolving and/or finely distributing ingredients in one or more solvent(s) and/or water;
   2. mixing the dissolved and/or finely distributed ingredients;
   3. coating a release liner, a release paper, a backing material, or a pressure-sensitive adhesive with the mixture of dissolved and/or finely distributed ingredients;
   4. evaporating the one or more solvent(s) and/or water, thereby forming a solid-form reactive adhesive film; and
   5. optionally winding the solid-form reactive adhesive film into a roll, wherein:
   the ingredients comprise:
      (a) an inert thermoplastic polyurethane film-forming matrix;
      (b) an at least one reactive monomer selected from the group consisting of methyl methacrylate, methacrylic acid, cyclohexyl methacrylate, tetrahydrofurfuryl methacrylate, 2-phenoxyethyl methacrylate, di-(ethylene glycol)-methyl ether methacrylate, and ethylene glycol dimethacrylate; and
      (c) a reagent selected from the group consisting of a radical initiator and an activator; and
   the solid-form reactive adhesive film has pressure-sensitive adhesive properties.

11. A kit for providing a two-component adhesive film system, comprising:
   (i) at least one first solid-form reactive adhesive film as claimed in claim 1 comprising a radical initiator; and
   (ii) at least one second solid-form reactive adhesive film as claimed in claim 1 comprising an activator.

12. A composite bonded by means of the reactive adhesive film system as claimed in claim 6.

13. A method for bonding two join partners to one another, wherein the join partners are fixed to one another by a self-adhesive bonding system and are ultimately bonded by a reactive adhesive film system as claimed in claim 6.

14. A composite bonded by the kit as claimed in claim 11.

* * * * *